United States Patent
Shah et al.

(10) Patent No.: US 12,547,709 B2
(45) Date of Patent: *Feb. 10, 2026

(54) METHOD OF TRAINING A SUBMODULE AND PREVENTING CAPTURE OF AN AI MODULE

(71) Applicants: Robert Bosch GmbH, Stuttgart (DE); Robert Bosch Engineering and Business Solutions Private Limited, Bangalore (IN)

(72) Inventors: Adit Jignesh Shah, Ahmedabad (IN); Manojkumar Somabhai Parmar, Ahmedabad (IN); Mayurbhai Thesia Yash, Ahmedabad (IN)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 268 days.

This patent is subject to a terminal disclaimer.

(21) Appl. No.: 18/005,924

(22) PCT Filed: Jul. 27, 2021

(86) PCT No.: PCT/EP2021/071022
§ 371 (c)(1),
(2) Date: Jan. 18, 2023

(87) PCT Pub. No.: WO2022/028956
PCT Pub. Date: Feb. 10, 2022

(65) Prior Publication Data
US 2023/0289436 A1    Sep. 14, 2023

(30) Foreign Application Priority Data
Aug. 6, 2020 (IN) .............................. 202041033610

(51) Int. Cl.
*G06F 21/55* (2013.01)
*G06F 21/57* (2013.01)

(52) U.S. Cl.
CPC .......... *G06F 21/554* (2013.01); *G06F 21/577* (2013.01)

(58) Field of Classification Search
None
See application file for complete search history.

(56) References Cited

U.S. PATENT DOCUMENTS

| | | | | |
|---|---|---|---|---|
| 2004/0019469 A1* | 1/2004 | Leary | ..................... | G05B 17/02 703/2 |
| 2015/0081222 A1* | 3/2015 | Laing | ..................... | G06N 20/00 702/9 |

(Continued)

OTHER PUBLICATIONS

International Search Report corresponding to PCT Application No. PCT/EP2021/071022, mailed Oct. 4, 2021 (English language document) (3 pages).

(Continued)

*Primary Examiner* — Raqiul A Choudhury
(74) *Attorney, Agent, or Firm* — Maginot, Moore & Beck LLP

(57) ABSTRACT

A method of training a submodule and preventing capture of an AI module is disclosed. Input data is received from at least one user through an input interface. It is transmitted through a blocker module to an AI module, which computes a first output data by executing a first model based on the input data. Input data is pre-processed by a submodule to obtain at least one subset of the input data. This submodule is trained using methods steps. The input data and the at least one subset of the input data are processed by the submodule to identify an attack vector from the input data. The identification information of the attack vector is sent to the information gain module.

6 Claims, 3 Drawing Sheets

(56) References Cited

U.S. PATENT DOCUMENTS

2016/0359740 A1* 12/2016 Parandehgheibi ...... H04L 69/16
2019/0087691 A1* 3/2019 Jelveh ................. G06F 18/2178
2019/0095629 A1 3/2019 Lee et al.
2021/0367926 A1* 11/2021 Jiménez .............. H04L 63/1416

OTHER PUBLICATIONS

Ling et al., "Evaluation of Machine Learning Algorithms for Prediction of Regions of High RANS Uncertainty," Aug. 4, 2015 (Aug. 4, 2015), XP055844040, Retrieved from the internet: URL: https://www.osti.gov/servlets/purl/1235329 [retrieved on Sep. 23, 2021].

Kesarwani et al., "Model Extraction Warning in MLaaS Paradigm," Dec. 3, 2018 (Dec. 3, 2018), pp. 371-380, XP058421558, DOI: 10.1145/3274694.3274740, ISBN: 978-1-4503-6569-7.

Eilertsen et al., "Classifying the classifier: dissecting the weight space of neural networks," ARXIV.org, Cornell University Library, 201 Olin Library Cornell University, Feb. 13, 2020 (Feb. 13, 2020), p. 2, Section 2, paragraph 3, XP081599075.

Nti et al., "A Comprehensive Evaluation of Ensemble Learning For Stock-Market Prediction," Mar. 11, 2020 (Mar. 11, 2020), XP055844045, DOI: 10.1186/s40537-020-00299-5, Retrieved from the Internet: URL:https://journalofbigdata.springeropen.com/track/pdf/10.1186/s40537-020-0299-5, [retrieved on Sep. 23, 2021].

Zhou et al., "A Simple Explanation of Information Gain and Theory," Apr. 25, 2020 (Apr. 25, 2020), XP055844050, Retrieved from the Internet: URL: https://web.archive.org/web/20200425181035/https://victorzhou.com/blog/information-gain/, Retrieved on Sep. 23, 2021.

* cited by examiner

METHOD OF TRAINING A SUBMODULE AND PREVENTING CAPTURE OF AN AI MODULE

This application is a 35 U.S.C. § 371 National Stage Application of PCT/EP2021/071022, filed on Jul. 27, 2021, which claims the benefit of priority to Serial No. IN 202041033610, filed on Aug. 6, 2020 in India, the disclosures of which are incorporated herein by reference in their entirety.

The following specification describes and ascertains the nature of this disclosure and the manner in which it is to be performed.

SUMMARY

The present disclosure relates to a method of training a sub-module in an AI system and a method of preventing capture of an AI module in the AI system.

BACKGROUND

With the advent of data science, data processing and decision making systems are implemented using artificial intelligence modules. The artificial intelligence modules use different techniques like machine learning, neural networks, deep learning etc. Most of the AI based systems, receive large amounts of data and process the data to train AI models. Trained AI models generate output based on the use cases requested by the user. Typically the AI systems are used in the fields of computer vision, speech recognition, natural language processing, audio recognition, healthcare, autonomous driving, manufacturing, robotics etc. where they process data to generate required output based on certain rules/intelligence acquired through training.

To process the inputs and give a desired output, the AI systems use various models/algorithms, which are trained using the training data. Once the AI system is trained using the training data, the AI systems use the models to analyze the real time data and generate appropriate result. The models may be fine-tuned in real-time based on the results. The models in the AI systems form the core of the system. Lots of effort, resources (tangible and intangible), and knowledge goes into developing these models.

It is possible that some adversary may try to capture/copy/extract the model from AI systems. The adversary may use different techniques to capture the model from the AI systems. One of the simple techniques used by the adversaries is where the adversary sends different queries to the AI system iteratively, using its own test data. The test data may be designed in a way to extract internal information about the working of the models in the AI system. The adversary uses the generated results to train its own models. By doing these steps iteratively, it is possible to capture the internals of the model and a parallel model can be built using similar logic. This will cause hardships to the original developer of the AI systems. The hardships may be in the form of business disadvantages, loss of confidential information, loss of lead time spent in development, loss of intellectual properties, loss of future revenues etc.

There are methods known in the prior arts to identify such attacks by the adversaries and to protect the models used in the AI system. The prior art US 20190095629A1—Protecting Cognitive Systems from Model Stealing Attacks discloses one such method. It discloses a method wherein the input data is processed by applying a trained model to the input data to generate an output vector having values for each of the plurality of pre-defined classes. A query engine modifies the output vector by inserting a query in a function associated with generating the output vector, to thereby generate a modified output vector. The modified output vector is then output. The query engine modifies one or more values to disguise the trained configuration of the trained model logic while maintaining accuracy of classification of the input data.

BRIEF DESCRIPTION OF THE DRAWINGS

An embodiment of the disclosure is described with reference to the following accompanying drawings.

DETAILED DESCRIPTION

Figure 1:
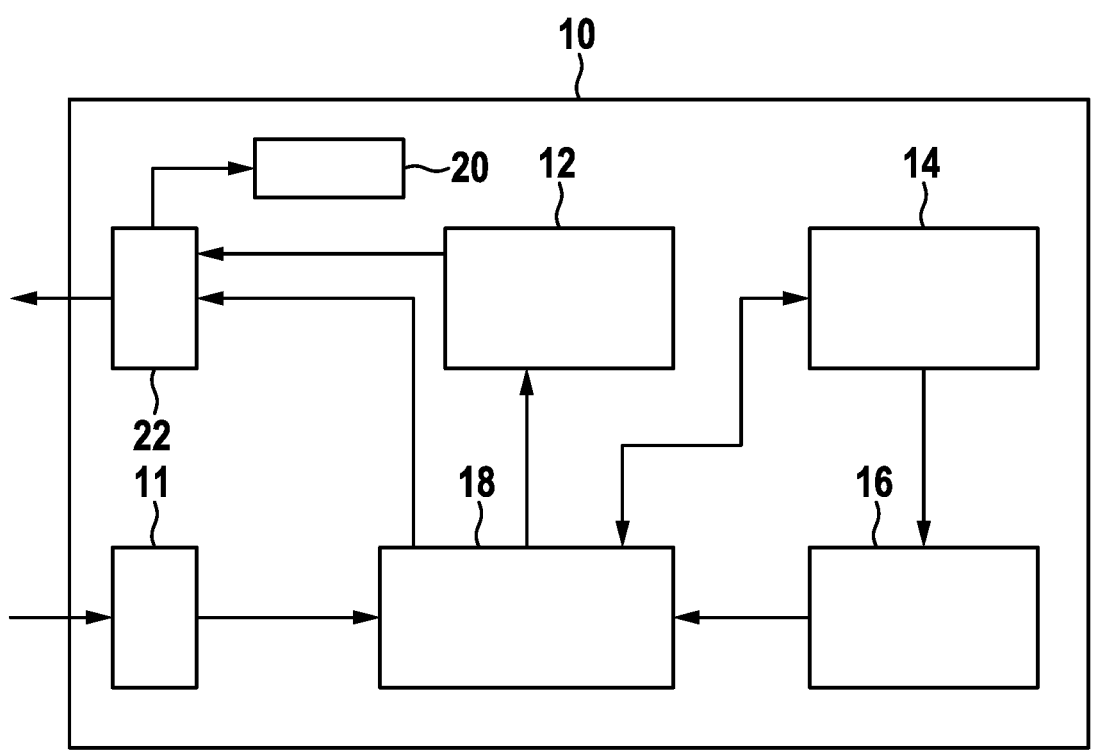
FIG. 1 depicts an AI system.

It is important to understand some aspects of artificial intelligence (AI) technology and artificial intelligence (AI) based systems or artificial intelligence (AI) system. This disclosure covers two aspects of AI systems. The first aspect is related to the training of a submodule in the AI system and second aspect is related to the prevention of capturing of the AI module in an AI system.

Some important aspects of the AI technology and AI systems can be explained as follows. Depending on the architecture of the implements AI systems may include many components. One such component is an AI module. An AI module with reference to this disclosure can be explained as a component which runs a model. A model can be defined as reference or an inference set of data, which is use different forms of correlation matrices. Using these models and the data from these models, correlations can be established between different types of data to arrive at some logical understanding of the data. A person skilled in the art would be aware of the different types of AI models such as linear regression, naïve bayes classifier, support vector machine, neural networks and the like. It must be understood that this disclosure is not specific to the type of model being executed in the AI module and can be applied to any AI module irrespective of the AI model being executed. A person skilled in the art will also appreciate that the AI module may be implemented as a set of software instructions, combination of software and hardware or any combination of the same.

Some of the typical tasks performed by AI systems are classification, clustering, regression etc. Majority of classification tasks depend upon labeled datasets; that is, the data sets are labelled manually in order for a neural network to learn the correlation between labels and data. This is known as supervised learning. Some of the typical applications of classifications are: face recognition, object identification, gesture recognition, voice recognition etc. Clustering or grouping is the detection of similarities in the inputs. The cluster learning techniques do not require labels to detect similarities. Learning without labels is called unsupervised learning. Unlabeled data is the majority of data in the world. One law of machine learning is: the more data an algorithm can train on, the more accurate it will be. Therefore, unsupervised learning models/algorithms has the potential to produce accurate models as training dataset size grows.

As the AI module forms the core of the AI system, the module needs to be protected against attacks. Attackers attempt to attack the model within the AI module and steal information from the AI module. The attack is initiated through an attack vector. In the computing technology a vector may be defined as a method in which a malicious code/virus data uses to propagate itself such as to infect a computer, a computer system or a computer network. Similarly an attack vector is defined a path or means by which a hacker can gain access to a computer or a network in order to deliver a payload or a malicious outcome. A model stealing attack uses a kind of attack vector that can make a digital twin/replica/copy of an AI module.

The attacker typically generates random queries of the size and shape of the input specifications and starts querying the model with these arbitrary queries. This querying produces input-output pairs for random queries and generates a secondary dataset that is inferred from the pre-trained model. The attacker then take this I/O pairs and trains the new model from scratch using this secondary dataset. This is black box model attack vector where no prior knowledge of original model is required. As the prior information regarding model is available and increasing, attacker moves towards more intelligent attacks. The attacker chooses relevant dataset at his disposal to extract model more efficiently. This is domain intelligence model based attack vector. With these approaches, it is possible to demonstrate model stealing attack across different models and datasets.

It must be understood that the disclosure in particular discloses methodology used for training a submodule in an AI system and a methodology to prevent capturing of an AI module in an AI system. While these methodologies describes only a series of steps to accomplish the objectives, these methodologies are implemented in AI system, which may be a combination of hardware, software and a combination thereof.

FIG. 1 depicts an AI system (10). The AI system (10) comprises an input interface (11), a blocker module (18), an AI module (12), a submodule (14), a blocker notification module (20), an information gain module (16) and at least an output interface (22). The input interface (11) receives input data from at least one user. The input interface (11) is a hardware interface wherein a used can enter his query for the AI module (12).

The blocker module (18) is configured to block a user when the information gain calculated based on his input attack queries exceeds a predefined threshold value. The blocker module (18) is further configured to modify a first output generated by an AI module (12). This is done only when the input is identified as an attack vector.

The AI module (12) to process said input data and generate the first output data corresponding to said input. The AI module (12) executes a model based on the input to generate a first output. As mentioned above this model could be any from the group of linear regression, naïve Bayes classifier, support vector machine, neural networks and the like.

Figure 2:
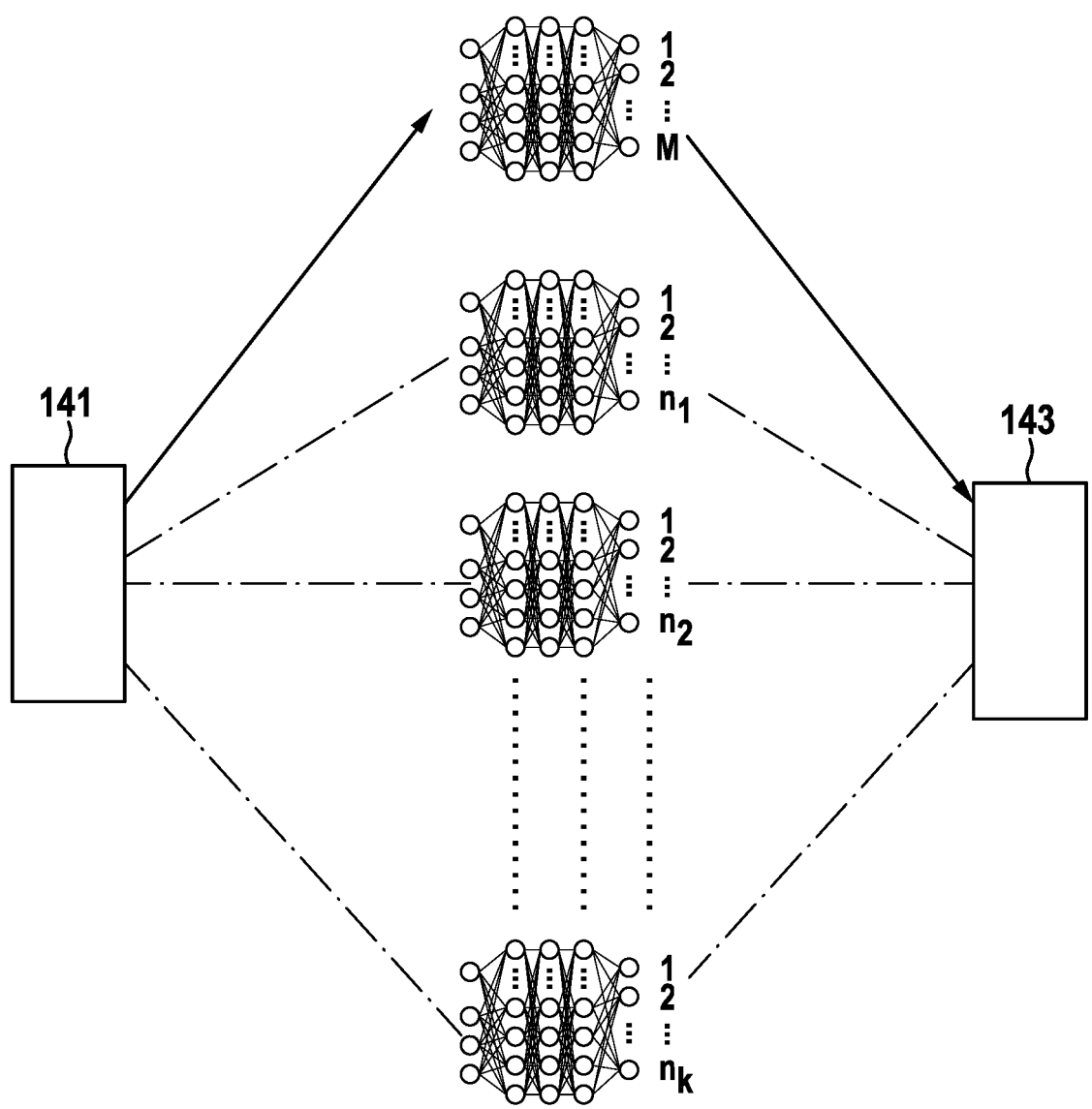
FIG. 2 depicts a submodule in an AI system.

The submodule (14) configured to identify an attack vector from the received input data. FIG. 2 depicts the submodule (14) in an AI system (10). The submodule (14) comprises a preprocessing block (141), at least two models and a comparator (143). In one embodiment the preprocessing block (141) can be a separate entity and in another embodiment, it can be integrated inside the submodule (14).

The preprocessing block (141) modifies the fidelity of any input it receives into at least two subsets. The fidelity of data is a term is used to define when data is transmitted from one sensor node to another, retains its actual meaning and granularity. For example in the domain of image processing a 1080p image has a higher fidelity than a 720p image. The preprocessing block (141) modifies the fidelity of the input. For example if the input received is a 1080p image, the preprocessor modifies this image into different resolutions of 720p, 480p and 240p as its subset. One subset comprises the original image i.e. the image with 1080p resolution. In another example if input is received is an audio signal corresponding to a particular sampling frequency 44 kHz, one subset of this input can be down sampled audio signal with sampling frequency of 8 kHz.

There at least two models inside the submodule (14) that process the input. These at least two models again could be any from the group of linear regression, naïve Bayes classifier, support vector machine, neural networks and the like. However at least one of the models is the same as the one executed by the AI module (12). For example if the AI module (12) executes a convolutional neural network (CNN) model, at least one module inside the submodule (14) will also execute the CNN model. The no. of models corresponds to the number of subsets the preprocessing block (141) can generate. Taking cue from the previous example if an image with 1080p resolution is pre-processed by the preprocessing block (141) into images of 720p, 480p and 240p resolutions, there would be 4 different models to process these images of different resolutions. Similarly, taking a cue from previous example of, if audio with 44 kHz is pre-processed by the preprocessing block (141) into audios of 22 kHz, 11 kHz, 8 kHz and 4 kHz resolutions, then there would be 5 different models to process these audio of different resolutions. A person skilled in the art will appreciate that similarly for other forms of data "n" number of models will be needed. The value of "n" is dynamic i.e. the no. of models executed by the submodule changes. This is dependent upon a current and historical values of information gain calculated by the information gain module.

The comparator (143) receives and compares the output received on the execution of the various models with inputs.

The blocker notification module (20) transmits a notification to the owner of said AI system (10) on detecting an attack vector. The notification could be transmitted in any audio/visual/textual form.

The information gain module (16) is configured to calculate an information gain and send the information gain value to the blocker module (18). The information gain is calculated using the information gain methodology. In an embodiment of this system, if the information gain extracted exceeds a pre-defined threshold, the AI system (10) is configured to lock out the user from system. The locking out the system is initiated if the cumulative information gain extracted by plurality of users exceeds a pre-defined threshold.

The output interface (22) sends output to said at least one user. The output sent by the output interface (22) comprises the first output data when the submodule (14) doesn't identify an attack vector from the received input. The output sent by the output interface (22) comprises a modified output received from the blocker module (18), when an attack vector is detected from the input.

It must be understood that each of the building blocks of the AI system (10) may be implemented in different architectural frameworks depending on the applications. In one embodiment of the architectural framework all the building block of the AI system (10) are implemented in hardware i.e. each building block may be hardcoded onto a microprocessor chip. This is particularly possible when the building blocks are physically distributed over a network, where each building block is on individual computer system across the network. In another embodiment of the architectural framework of the AI system (10) are implemented as a combination of hardware and software i.e. some building blocks are hardcoded onto a microprocessor chip while other building block are implemented in a software which may either reside in a microprocessor chip or on the cloud.

Figure 3:
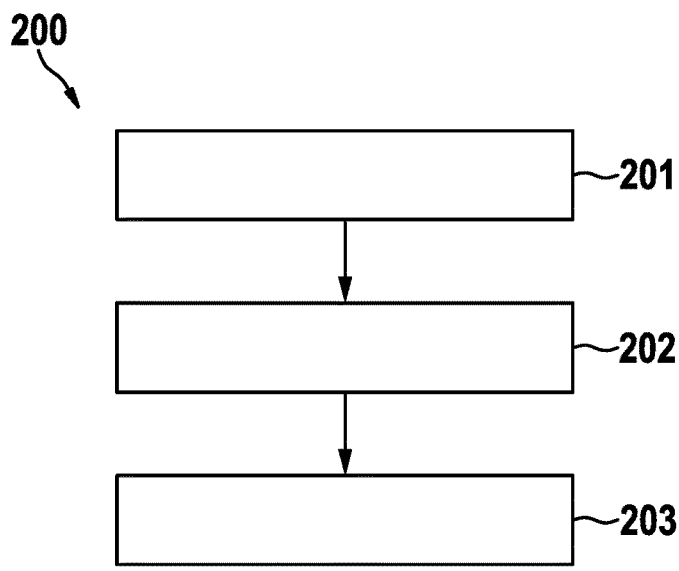
FIG. 3 illustrates method steps of training a submodule in an AI system.

FIG. 3 illustrates method steps (200) of training a submodule (14) in an AI system (10). The AI system (10) comprises the components described above in FIGS. 1 and 2. The submodule (14) is trained using a dataset used to train the AI module (12). In step 201, the pre-processing block modifies the fidelity of the dataset to obtain at least one subset of the original dataset. For example if the input dataset received is a 1080p image, the preprocessor modifies this image into different resolutions of 720p, 480p and 240p as its subsets. In another example, if the input dataset is received as 44 kHz audio signal, the preprocessor modifies this audio signal in to different resolutions of 22 kHz, 11 kHz and 8 kHz as its subsets In step 202 at least two models receive the original dataset and said at least one subset as input. In step 203, said at least two models are executed with the said input. Each model in the submodule (14) can be executed for a dataset corresponding to a particular fidelity. One of the models in the said at least two models is the first model (M). This first model (M) as explained in the preceding paragraphs is executed by the AI module (12). In step 204, the behavior of said submodule (14) is recorded.

Figure 4:
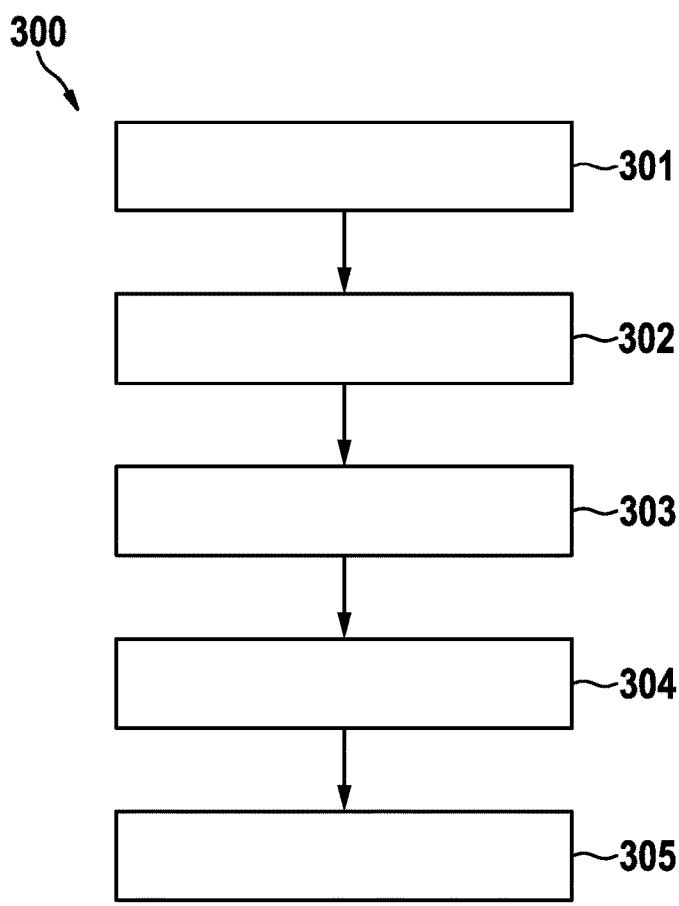
FIG. 4 illustrates method steps to prevent capturing of an AI module in an AI system.

FIG. 4 illustrates method steps (300) to prevent capturing of an AI module (12) in an AI system (10). The AI system (10) and its components have been explained in the preceding paragraphs by means of FIGS. 1 and 2. A person skilled in the art will understand that the submodule (14) trained by the method steps (200) is now used in real time for preventing capture of an AI module (12) in an AI system (10).

In method step 301, input interface (11) receives input data from at least one user. In step 302, this input data is transmitted through a blocker module (18) to an AI module (12). In step 303, the AI module (12) computes a first output data by the AI module (12) executing a first model (M) based on the input data.

In step 304, the input data is pre-processed by a submodule (14) to obtain at least one subset of the input data. This preprocessing is done by a preprocessing block (141) in the submodule (14). In one embodiment the preprocessing block (141) can be a separate entity and in another embodiment, it can be integrated inside the submodule (14). The preprocessing block (141) modifies the fidelity of any input it receives to obtain at least one subset or the input.

In step 305, input data and said at least one subset of the input data is processed by submodule (14) to identify an attack vector from the input data, the identification information of the attack vector is sent to the information gain module (16). Processing the input data and said at least one subset of the input data further comprises two stages. First at least two models inside the submodule (14) are executed with the input data and said at least one subset. One of the models is the first model (M) i.e. it is same as the one executed by the AI module (12). Next the outputs received on execution of said at least two models is compared. An input data is determined as an attack vector based on the above comparison. If the outputs received are same, it means that's the input was not an attack vector. However if the comparator (143) finds difference in the outputs it inferred that the input is an attack vector.

Once the attack vector identification information is sent to the information gain module (16), an information gain is calculated. The information gain is sent to the blocker module (18). If the information gain exceeds a pre-defined threshold, the user is blocked and the notification is sent the owner of the AI system (10) using blocker notification module (20) as one of the embodiment. If the information gain is below a pre-defined threshold, although an attack vector was detected, the blocker module (18) may modify the first output generated by the AI module (12) to send it to the output interface (22).

In addition the user profile may be used to determine whether the user is habitual attacker or was it one time attack or was it only incidental attack etc. Depending upon the user profile, the steps for unlocking of the system may be determined. If it was first time attacker, the user may be locked out temporarily. If the attacker is habitual attacker then a stricter locking steps may be suggested.

It must be understood that the embodiments explained in the above detailed description are only illustrative and do not limit the scope of this disclosure. Any modification to a method of training a submodule (14) and preventing capture of an AI module (12) are envisaged and form a part of this disclosure. The scope of this disclosure is limited only by the claims.

We claim:

1. An AI system, comprising:
   an input interface configured to receive input from at least one user;
   at least one processor configured to:
      process the received input with an AI module and generate first output data corresponding to the received input;
      identify an attack vector based on the received input using a trained submodule that executes at least two models and compares the output of the at least two models;
      calculate an information gain based on the received input; and
      block the at least one user, depending on the information gain, by modifying the first output generated by the AI module; and
   an output interface configured to send an output to the at least one user.

2. The AI system as claimed in claim 1, wherein the processor is further configured to pre-process the received input.

3. The AI system as claimed in claim 1, wherein the output sent by the output interface comprises the first output data in response to an attack vector from the received input not being identified.

4. A method to prevent capturing of an AI module in an AI system, comprising:
   receiving input data from at least one user through an input interface;
   computing a first output data by the AI module executing a first model based on the input data;
   pre-processing the input data to obtain at least one subset of the input data;
   processing the input data and the at least one subset of the input data to identify an attack vector from the input data, the processing including (i) executing at least two models with the input data and the at least one subset, one of the at least two models is the first model, (ii) comparing the outputs received on execution of the at least two models, and (iii) determining the input data as the attack vector based on the comparison; and sending identification information of the attack vector.

5. The method to prevent the capturing of the AI module in the AI system as claimed in claim 4, wherein preprocessing the input data comprises modifying fidelity of the input data to obtain the at least one subset of the input data.

6. The AI system as claimed in claim 1, wherein the output sent by the output interface comprises a notification to an owner of said AI system in response to identifying the attack vector.

* * * * *